United States Patent [19]

Kanakura et al.

[11] Patent Number: 4,916,195

[45] Date of Patent: Apr. 10, 1990

[54] POLY(N-ACYLETHYLENEIMINE) GRAFTED POLYSILOXANE AND ITS PREPARATION

[76] Inventors: Akihiro Kanakura, 25-22-405, Shakusonji-cho, Hirakata-shi, Osaka-fu; Yoshio Eguchi, 1-10-2, Sumiyoshi, Ikeda-shi, Osaka-fu; Ryuzo Mizuguchi, 42-6-301, Hashimoto-Kurigatani, Yawata-shi, Kyoto-fu; Mitsuhiro Takarada, 787-2, Yanase, Annaka-shi, Gunma-ken; Yoshio Okamura, 3-19-1, Isobe, Annaka-shi, Gunma-ken; Hideyuki Itoh, 1610, Nishikamiisobe, Annaka-shi, Gunma-ken, all of Japan

[21] Appl. No.: 199,265

[22] Filed: May 9, 1988

[30] Foreign Application Priority Data

May 8, 1987 [JP] Japan ................................. 62-112938

[51] Int. Cl.$^4$ ............................................ C08F 283/00

[52] U.S. Cl. ...................................... 525/474; 528/25; 528/27; 556/419; 556/425

[58] Field of Search ................... 525/474; 528/27, 25; 556/419, 425

[56] References Cited

U.S. PATENT DOCUMENTS

| | | | |
|---|---|---|---|
| 4,311,827 | 1/1982 | Noren | 525/474 |
| 4,529,793 | 7/1985 | Abe et al. | 528/27 |
| 4,785,070 | 11/1988 | Rasmussen et al. | 525/474 |

*Primary Examiner*—Melvyn I. Marquis
*Attorney, Agent, or Firm*—Wenderoth, Lind & Ponack

[57] ABSTRACT

The invention concerns a novel process for the preparation of poly(N-acylethyleneimine) grafted polysiloxanes comprising sulfo-esterifying all or part of alcoholic hydroxyl groups of a hydroxy containing polysiloxane and conducting, in said sulfo-esterification reaction mixture, ring-opening polymerization of a 2-oxazoline compound. The present process can afford the desired poly(N-acylethyleneimine) grafted polysiloxane in a higher reaction yield.

3 Claims, 1 Drawing Sheet

POLY(N-ACYLETHYLENEIMINE) GRAFTED POLYSILOXANE AND ITS PREPARATION

FIELD OF INVENTION

The present invention relates to a novel process for the preparation of poly(N-acylethyleneimine) grafted polysiloxanes and to a certain type of novel poly (N-acylethyleneimine) grafted polysiloxanes thus obtained.

BACKGROUND OF THE INVENTION

Recently, poly (N-acylethyleneimine) grafted polysiloxanes have been watched with great interest as one of the most prominent surfactants, lubricants and resin compatibility modifiers. This is because they each have a specific molecular structure wherein a hydrophilic portion of poly N-acylethyleneimine and a hydrophobic portion of polysiloxane are maldistributed in the same molecule. Such polysiloxanes were first reported by Mr. Takeo Saegusa, at the meeting of Japan Chemical Society, Spring Session 54, (abstract of said lecture was published 1987). According to the synthetic method proposed by Mr. Saegusa, a vinyl group-containing tosyl ester is reacted with oxazoline to give a vinyl group-containing poly N-acylethyleneimine compound, and the latter is then reacted with polysiloxane in the presence of platinic acid catalyst, thereby effecting addition reaction of the SiH portion of said polysiloxane and said vinyl group to give the desired grafted polysiloxane. However, in that method, there are many problems still awaiting solutions. That is, (1) since an allyl tosylate is thermally and chemically unstable, there often occurs, under oxazoline's ring-opening polymerization conditions, such side-reaction as polymerization of the double bond, (2) since the involved reaction is the reaction between polymer and polymer (i.e. poly N-acylethyleneimine compound and polysiloxane), determination of appropriate solvent and other reaction conditions are considerably difficult to do, (3) since the poly N-acylethyleneimine compound carries hydroxyl groups, the addition reaction with silane compound in the presence of platinic acid catalyst is hindered by said hydroxyl groups, and (4) since poly N-acylethyleneimine is prepared by the reaction of tosyl ester and oxazoline, it must be separated from the reaction mixture and purified before using it in the subsequent addition reaction, or otherwise the remaining tosyl groups will hinder said addition reaction. Furthermore the poly (N-acylethyleneimine) grafted polysiloxanes disclosed in the abovementioned report do not have any functional groups other than N-acylethyleneimine. Therefore, even if a novel class of polysiloxane derivatives is desired for additional objects as, for example, solubility regulation activity, reactivity or the like, it is essential to introduce the desired functional groups into the polysiloxane molecule by adopting a series of complicated reaction means.

It is, therefore, an object of the invention to provide a novel process for the preparation of poly (N-acylethyleneimine) grafted polysiloxanes, which is free from the abovementioned problems and easily applicable to an industrial scale of production of said grafted polysiloxanes. A further object of the invention is to provide a novel class of poly (N-acylethyleneimine) grafted polysiloxanes having additional functional groups other than N-acylethyleneimine.

SUMMARY OF THE INVENTION

According to the present invention, the aforesaid objects can be attained by providing a process for preparing a poly (N-acylethyleneimine) grafted polysiloxane represented by the formula:

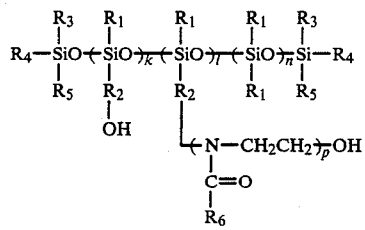

wherein each $R_1$ is the same or different member and is selected from the group consisting of an alkyl having 1 to 18 carbon atoms and an aryl; $R_2$ is an alkylene chain having 1 to 100 carbon atoms optionally interrupted by ether and/or ester bonds; $R_3$, $R_4$ and $R_5$ each represents the same or different member and is selected from the group consisting of hydroxyl, allyloxy, an alkyl having 1 to 20 carbon atoms, an alkoxy having 1 to 20 carbon atoms and a ω-hydroxy alkyl having 1 to 100 carbon atoms optionally interrupted by ether and/or ester bonds; $R_6$ represents an alkyl having 1 to 40 carbon atoms, an aralkyl or an aryl group optionally including hydroxyl; k, l and n each is a real number representing the number of siloxane repeating units and fulfilling the requirements: $k \geq 0$, $l \geq 1$, $n \geq 0$ and $2 \leq k+l+n \leq 2000$; and p represents a real number showing the polymerization degree of N-acylethyleneimine and determined in a range of $1 \leq p \leq 200$, comprising sulfo-esterifying all or part of alcoholic hydroxy groups of a hydroxy-containing polysiloxane of the formula:

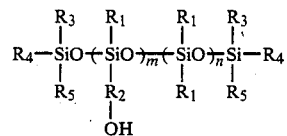

wherein $R_1$, $R_2$, $R_3$, $R_4$ and $R_5$ are as defined above; m and n each is a real number representing the number of siloxane repeating units and fulfilling the requirements: $m \geq 1$, $n \geq 0$ and $2 \leq m+n \leq 2000$, and conducting ring-opening polymerization of 2-oxazoline compound of the formula:

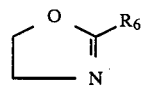

(wherein $R_6$ is as defined above) in said sulfo-esterification reaction mixture, thereby obtaining the desired poly (N-acylethyleneimine) grafted polysiloxane. By using the present process, there are provided poly (N-acylethyleneimine) grafted polysiloxanes of the formula:

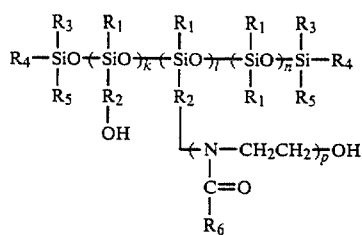

very easily and in a higher reaction yield. Among them, the grafted polysiloxanes in which k represents a positive number are novel compounds and various novel polysiloxanes may be easily prepared by utilizing the reactive alcoholic hydroxyl groups contained therein.

PREFERRED EMBODIMENTS OF THE INVENTION

Figure 1:
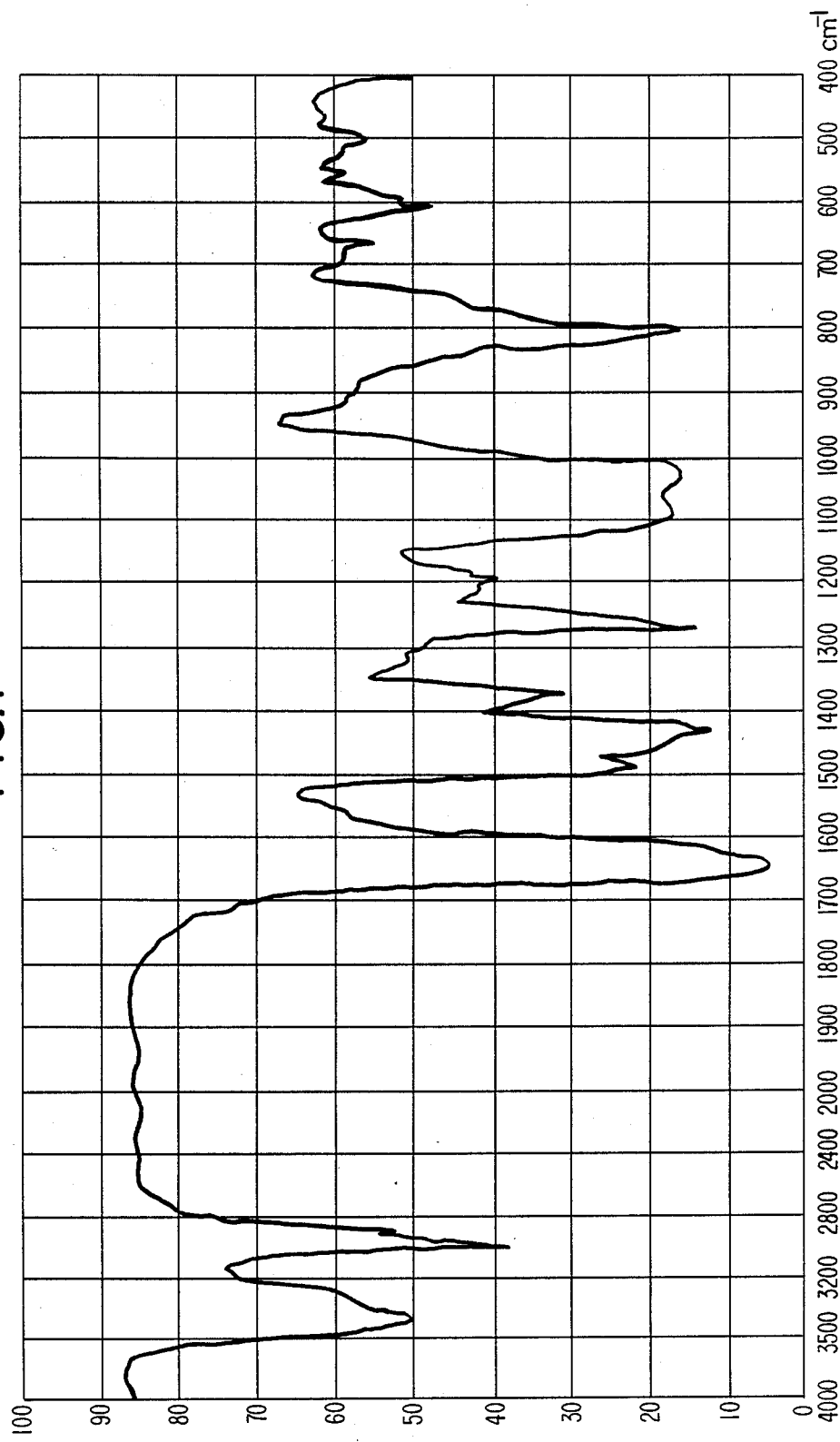
FIG. 1 is IR spectrum chart of poly (N-acetylethyleneimine) grafted polysiloxane of Example 1.

The alcoholic hydroxyl group containing polysiloxanes of the formula:

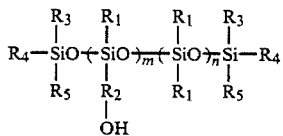

(wherein $R_1$, $R_2$, $R_3$, $R_4$ and $R_5$, m and n are as defined above) used as the starting material in the present process may be easily prepared by those skilled in the art following a conventional synthetic means.

For example, a polysiloxane of the formula:

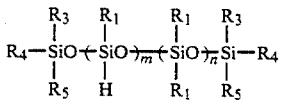

is reacted with m moles of alkeneoxy trimethyl silane in the presence of platinic acid catalyst to obtain a compound of the formula:

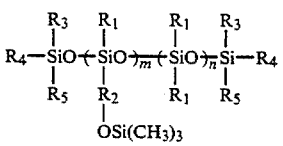

and thus obtained compound is then subjected to hydrolysis to obtain the aforesaid alcoholic hydroxyl group-containing polysiloxane. In this method, since no hydroxyl groups are contained in the alkeneoxy trialkyl silane used in the aforesaid addition reaction, and since no polymer-to-polymer reaction is involved, the desired polysiloxane starting material could be very easily prepared in a higher reaction yield. Employable reaction conditions are easily selected, too.

Sulfo-esterification of said alcoholic hydroxyl group-containing polysiloxane may be carried out with a sulfonic acid or its reactive derivative in a known way. A particularly preferable method is to react said polysiloxane with a sulfonic halide (especially chloride) such as p-toluene sulfonic halide, methane sulfonic halide and trifluoromethane sulfonic halide, in the presence of a base such as pyridine.

In the present process, it is possible to control the degree of sulfo-esterification of said alcoholic hydroxyl groups in any desired proportion by varying the amount of sulfonic acid or its reactive derivative and controlling the reaction conditions to be used.

In the next place, thus obtained sulfo-esterified polysiloxane is used as an initiating polymer and a 2-oxazoline compound of the formula:

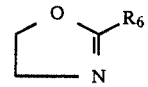

is polymerized by ring-opening polymerization.

Said reaction may be easily carried out in an appropriate solvent such as, for example, acetonitrile, chloroform and the like, by mere application of heating.

In this reaction, sulfonic acid is by-produced and therefore, such acid may be preferably and desirably removed from the reaction mixture by an ion-exchange means using an appropriate hydroxyl type anion exchange resin. However, at the time when the final product is to be used in an aqueous medium and such anion residue will not give any harmful effect, it is, of course, no essential to adopt such purification means.

Thus, in the present process, polymer-to-polymer reaction is not included, reaction conditions may be selected in a comparatively free and easy way, and the involved addition reaction of silane and vinyl group can be easily done in the presence of platinic acid catalyst. Therefore, the desired poly (N-acylethyleneimine) grafted polysiloxane can be advantageously and easily prepared in a higher yield. Furthermore, since some of the reactive hydroxy groups can be left unreacted in any desired proportion in the final product, the present polysiloxane may be used as a starting material for the synthesis of other novel grafted polysiloxanes. Since the present polysiloxane has a specific molecular structure wherein a poly N-acylethyleneimine hydrophilic portion and a polysiloxane hydrophobic portion are maldistributed in the same molecule, and which has a quantity of alcoholic hydroxyl groups, said polysiloxane has particular surface activities and hence is useful as a surfactant, a lubricant, a resin compatibility modifier and the like.

The invention shall be now more fully explained in the following examples. Unless otherwise stated, all parts and percentages are by weight.

EXAMPLE 1

10 g of alcoholic hydroxyl group-containing polysiloxane (hereinunder referred to as Siloxane A) of the formula:

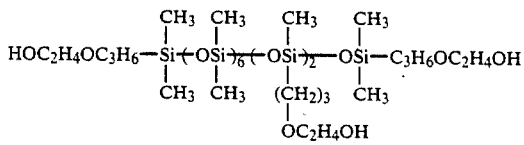

were dissolved in a mixture of 30.0 ml of well dried chloroform and 20.0 ml of dried pyridine. To this, were added, while maintaining the reaction temperature at 10° C. or less, 3.4 g of 4-toluene sulfonyl chloride and the combined mixture was stirred at room temperature overnight. Then, chloroform and pyridine were distilled off under reduced pressure and the residue was extracted with ether. After drying and distilling the solvent from the extract, a viscous product of sulfoesterified polysiloxane was obtained. 4.0 g of thus obtained polysiloxane initiator and 4.0 g of 2-methyl-2-oxazoline were dissolved in 8.0 ml of acetonitrile and the combined mixture was reacted under nitrogen gas stream at 90° C. for 5 hours. The heated residue (105° C.×3 hours) weighed a theoretical amount, which meant that 100% of 2-methyl-2-oxazoline was polymerized. After cooling, tosylate anions were removed off by using hydroxyl type anionic exchange resin and poly (N-acetylethyleneimine) grafted polysiloxane was obtained as a transparent, light yellow colored polymer having the least fluidity.

Solubilities of said poly (N-acetylethyleneimine) grafted polysiloxane in various solvents are shown in Table 1 and IR spectrum chart of said polysiloxane is attached herein as FIG. 1.

EXAMPLE 2

The procedures of Example 1 were repeated excepting increasing the amount of 2-methyl-2-oxazoline to 8.0 g, to obtain a transparent, light yellow colored poly (N-acetylethyleneimine) grafted polysiloxane having the least fluidity. Solubilities of thus obtained polymer in various solvents are shown in Table 1.

EXAMPLE 3

[Preparation of 2-β-hydroxyethyl-2-oxazoline]

51.1 g (0.6 mol) of 2-methyl-2-oxazoline and 6.65 g (0.2 mol) of 95% para formaldehyde were reacted at 100° C. for 4 hours. After cooling, the excess amount of 2-methyl-2-oxazoline was distilled off under reduced pressure to obtain 2-β-hydroxyethyl-2-oxazoline.

[Preparation of grafted polysiloxane]

4.0 of thus obtained 2-β-hydroxyethyl-2-oxazoline were reacted following the procedures of Example 1. Thus obtained poly (N-β-hydroxyethylcarbonylethyleneimine) grafted polysiloxane was a very viscous and transparent, light yellow colored polymer, whose solubilities in various solvents are shown in Table 1.

EXAMPLE 4

Using 10.0 g of alcoholic hydroxyl group-containing polysiloxane (hereinunder referred to as Siloxane B) of the formula:

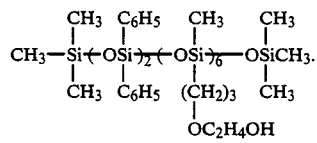

The procedures of Example 1 were repeated to obtain poly (N-acetylethyleneimine) grafted polysiloxane, which was a transparent, light yellow colored polymer having no fluidity. Solubility characteristics are shown in Table 1.

REFERENCE EXAMPLE

[Preparation of poly (N-acetylethyleneimine)]

25.6 g (0.3 mol) of 2-methyl-2-oxazoline and 11.2 g (0.06 mol) of methyl tosylate were dissolved in 150 ml of acetonitrile and the combined mixture was reacted under nitrogen atmosphere at 90° C. for 5 hours. The heated residue (105° C.×3 hours) weighed a theoretical amount, which indicated that 100% of 2-methyl-2-oxazoline was polymerized. Then the mixture was allowed to cool. To this, were added 6.4 g (0.06 mol) of benzylamine, and the mixture was stirred at room temperature overnight. Next, tosylate anion was removed off by using a hydroxyl type anion exchange resin, and a highly viscous, transparent, light yellow colored poly (N-acetylethyleneimine) was obtained.

Thus obtained poly (N-acetylethyleneimine) was not compatible with aforesaid Siloxane A and Siloxane B and therefore, when combined with these siloxanes, there was a clear phase separation in each case. Solubility characteristics of said poly (N-acetylethyleneimine) are shown in Table 1.

TABLE 1

| | Solubility characteristics of grafted poysiloxanes (10 weight %, room temperature) | | | | | | |
|---|---|---|---|---|---|---|---|
| | Example | | | | Siloxane | | Reference |
| | 1 | 2 | 3 | 4 | A | B | Example |
| toluene | X | XX | XX | △ | O | ⊙ | XX |
| THF | △ | X | △ | O | ⊙ | ⊙ | X |
| acetonitrile | O | O | ⊙ | ⊙ | △ | ⊙ | ⊙ |
| water | O | O | O | △ | XX | XX | ⊙ |

XX ... complete separation, clear solvent
X ... complete separation, turbid solvent
△ ... separation after standing, easily re-dispersible in solvent
O .. uniformly and stably dispersed in solvent, slightly turbid solvent
⊙ ... completely clear solution

What is claimed is:

1. A process for preparing a poly(N-acylethyleneimine) grafted polysiloxane represented by the formula:

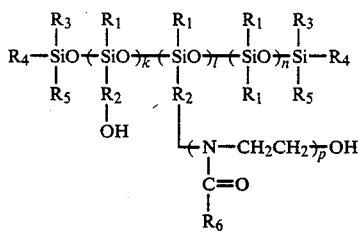

wherein each $R_1$ is the same or different member selected from the group consisting of alkyl having 1 to 18 carbon atoms and aryl; $R_2$ is an alkylene chain having 1 to 100 carbon atoms, an alkylene chain having 2 to 100 carbon atoms which is interrupted by one or more ether bonds, or an alkylene chain having 2 to 100 carbon atoms which is interrupted by one or more ester bonds; $R_3$, $R_4$ and $R_5$ each represents the same or different member selected from the group consisting of hydroxyl, allyloxy, alkyl having 1 to 20 carbon atoms, alkoxy having 1 to 20 carbon atoms, ω-hydroxy alkyl having 1 to 100 carbon atoms, ω-hydroxy alkyl having 2 to 100 carbon atoms which is interrupted by one or more ether bonds, and ω-hydroxy alkyl having 2 to 100 carbon atoms which is interrupted by one or more ester bonds; $R_6$ represents alkyl having 1 to 40 carbon atoms, aralkyl, aryl or said group substituted by hydroxy; k, l and n each is a real number representing a number of siloxane repeating units and fulfilling the requirements $k \geq 0$, $l \geq 1$, $n \geq 0$ and $2 \leq k+l+n \leq 2,000$; and p is a real number representing a polymerization degree of N-acylethyleneimine and determined in a range of $1 \leq p \leq 200$, which process comprises sulfo-esterifying all or part of alcoholic hyroxy groups of a hydroxy-containing polysiloxane of the formula:

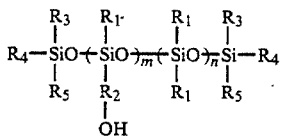

wherein $R_1$, $R_2$, $R_3$, $R_4$ and $R_5$ are as defined above; m and n each is a real number representing a number of siloxane repeating units and fulfilling the requirements $m \geq 1$, $n \geq 0$ and $2 \leq m+n \leq 2000$, by reacting said hydroxy-containing polysiloxane with a sulfonic halide in the presence of a base to obtain a sulfo-ester polysiloxane, and conducting a ring-opening polymerization of a 2-oxazoline compound of the formula:

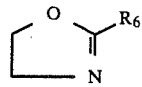

wherein $R_6$ is as defined above, in the resultant sulfo-esterification reaction mixture, thereby reacting said sulfo-ester polysiloxane and polymerized oxazoline compound to give said poly(N-acylethyleneimine) grafted polysiloxane.

2. A process according to claim 1, wherein the sulfonic halide is p-toluene sulfonic halide, methane sulfonic halide or trifluoromethane sulfonic halide.

3. A process according to claim 1, wherein the 2-oxazoline compound is 2-methyl-2-oxazoline, 2-ethyl-2-oxazoline or 2-hydroxyethyl-2-oxazoline.

* * * * *